F. MAUS.
METHOD OF AND APPARATUS FOR DEHYDRATING MATERIAL.
APPLICATION FILED FEB. 3, 1921.
1,418,386.
Patented June 6, 1922.
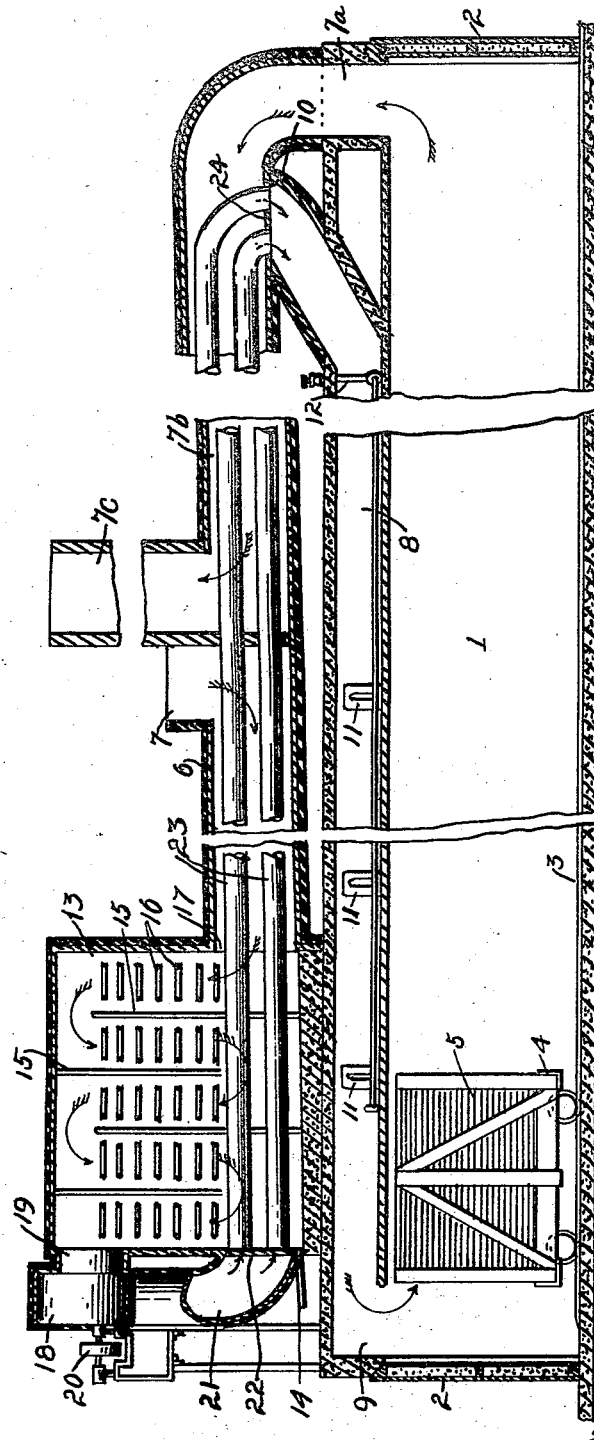
INVENTOR
Frank Maus
BY John A. Naismith
ATTORNEY

UNITED STATES PATENT OFFICE.

FRANK MAUS, OF SAN JOSE, CALIFORNIA, ASSIGNOR OF ONE-HALF TO SIEBREN J. SPOELSTRA, OF SAN JOSE, CALIFORNIA.

METHOD OF AND APPARATUS FOR DEHYDRATING MATERIAL.

1,418,386.   Specification of Letters Patent.   Patented June 6, 1922.

Application filed February 3, 1921. Serial No. 442,261.

*To all whom it may concern:*

Be it known that I, FRANK MAUS, a citizen of the United States, and resident of San Jose, in the county of Santa Clara and State of California, have invented certain new and useful Improvements in Methods of and Apparatus for Dehydrating Materials, of which the following is a specification.

This invention relates to a method of dehydration wherein the air used is drawn from the atmosphere and thereafter utilized in the manner set forth in my copending applications for dehydrating apparatus, Serial No. 438713, filed Jan. 20, 1921, and method of cooling and dehydrating materials, Serial No. 441608, filed Feb. 1, 1921.

It is the object of my invention to provide a method wherein certain classes of materials requiring slow treatment may be dehydrated at a suitable temperature, and wherein heat introduced into the dehydrator by the material itself and the carrier therefor is utilized to supply sensible heat and latent heat of evaporation. It is a further object to provide a method in which a minimum amount of heat is introduced from an outside source (in addition to the heat supplied by the material and carriers) and in which the dehydrated material is delivered from the dehydrator at a proper temperature for storage. A still further object is to provide a method in which the material is at one and the same time subjected to the dehydrating action of dry air and the cooling action of cold air, or in which the material is subjected to the dehydrating action of heated dry air. And, finally, it is an object of the present invention to provide a method of and apparatus for dehydrating material in which the air is drawn from the atmosphere, utilized in the manner hereinafter set forth to accomplish the desired results and again discharged into the atmosphere.

The drawing is a vertical and longitudinal section through my improved dehydrator, part being broken away.

Referring more particularly to the drawing, I provide at 1 a heat insulated tunnel or chamber fitted with doors 2—2 and a track 3 upon which suitable trucks as 4 are mounted carrying trays 5 laden with material such as prunes, etc., to be dried and cooled.

At 6 is shown a slightly inclined heat insulated conduit arranged over tunnel 1 and terminating at a point intermediate the length of tunnel 1 as at air inlet 7, said tunnel having an air discharge outlet at $7^a$ into a conduit $7^b$. Conduit $7^b$ is preferably arranged in axial alignment with relation to conduit 6 and terminates at a point adjacent to air inlet 7 forming a dehydration air outlet as at $7^c$. A passage 8 is arranged over chamber 1 and communicates therewith at the end opposite to the outlet $7^a$ and terminates at a point 10 adjacent to said passage $7^a$. A series of heating units as steam radiators are arranged in passage 8 as at 11, a supply pipe being shown at 12.

Over chamber 1 and passage 8 at end 9 thereof is built a heat insulated chamber 13 provided with a drain at 14, a series of baffle plates at 15 and refrigerating coils at 16. This chamber 13 has open communication with conduit 6 at 17. At 18 is shown a fan communicating with chamber 13 at 19 and operated through the medium of a pulley at 20, a discharge pipe being shown at 21 terminating in a plate 22 into which are set the ends of pipes 23. Pipes 23 are arranged to pass through conduits 6 and $7^b$ and extend from pipe 21 to the end 10 of passage 8 with which they communicate through plate 24 in which they are mounted.

Assuming then that the fan 18 is in operation, air is drawn from the atmosphere into the conduit 6 at end 7, and caused to circulate through conduit 6, chamber 13, fan 18, pipe 21, pipes 23, conduit 8, chamber 1 and conduit $7^b$ to a point of discharge into the atmosphere at $7^c$.

In this process the air is drawn from the atmosphere and utilized to raise the temperature of the dehydration air after cooling and drying, and the dehydration air, after passing through chamber 1 is utilized to still further raise the temperature of the dried air before it is passed into chamber 1.

In this process the air is drawn directly from the atmosphere and carried through conduit 6 to the refrigerator where its moisture is extracted by the reduction in temperature of the air. In carrying the air to the dehydration chamber, however, it is passed through conduits 23 so as to pick up heat from the inflowing air at atmospheric temperature and from the air exhausted from the dehydration chamber into conduit $7^b$. The heat absorbed in this manner may be sufficient to raise the temperature of the inflowing air to a point approaching the temperature of the exhaust dehydration air, whereupon it is passed through conduit 8 to the dehydration chamber, the heating elements 11 being used or not as conditions may require.

As one example of the practical application of this process, the materials to be treated are introduced into the dehydration chamber at a lower temperature than that of the inflowing dehydration air. The heated dry air passing around the said material takes up moisture therefrom and passes from the chamber 1 at a point adjacent to the point of entrance of the said material. This exhaust dehydration air is then passed through conduit 7$^b$ and around pipes 23 where it surrenders a large portion of its heat to the air flowing through pipes 23, and is finally discharged into the atmosphere at 7$^c$.

As another example of the practical application of this process the material to be treated is introduced into the dehydration chamber at a higher temperature than that of the inflowing air, the said material and the carriers therefor introducing sensible heat into the chamber. A large portion of this sensible heat is taken up by the dehydration air as both sensible heat and latent heat of evaporation, thereby effectually reducing the temperature and moisture content of the treated material which is discharged from the chamber at substantially the same temperature as the atmosphere. A large portion of this sensible heat and latent heat of evaporation is surrendered to the air flowing through pipes 23 in conduit 7$^b$ and the exhaust dehydration air is finally discharged into the atmosphere at 7$^c$.

The foregoing statement as to reduction of temperature will not always apply to a material extent of course, but only when the material carries a surplus of heat, it being obvious that if the material is inserted at substantially atmospheric temperature its temperature when discharged will be at least slightly below atmospheric temperature.

The heating elements are used, of course, only when the cooled and dried air does not absorb enough heat from the inflowing air from the atmosphere and the exhaust from the dehydration chamber to raise the temperature thereof to the required point, such as when the material to be treated is received in the dehydration chamber directly from a heated dry air dehydrator but does not carry a large amount of surplus heat, or when the process is to be operated as a heated dry air dehydrator.

The material treated as above set forth is introduced into chamber 1 at the end thereof opposite to the dehydration air inlet and therefor passes through the chamber in an opposite direction to the air flow.

It is to be understood that while I have herein disclosed one specific embodiment of my invention the disclosure is to be considered as illustrative only and in no way to limit the scope of the appended claims.

I claim:

1. A dehydration apparatus comprising an air cooling chamber, a dehydration chamber, a conduit communicating with said cooling chamber and the atmosphere, a conduit communicating with said dehydration chamber and the atmosphere, a conduit connecting said chambers and operatively arranged with relation to said first mentioned conduits to absorb heat from the air passing therethrough, and means for causing air to circulate through said conduits and chambers.

2. A dehydration apparatus comprising an air cooling chamber, a dehydration chamber, a conduit communicating with said cooling chamber and the atmosphere, a conduit communicating with said dehydration chamber and the atmosphere, a conduit connecting said chambers and passing through both of said first mentioned conduits, and means for causing air to circulate through said conduits and chambers.

3. The process of dehydrating materials in a dehydration chamber which consists in reducing the moisture content of atmospheric air by cooling the same, and then heating the cooled air before circulating it around the material to be dried, by passing the cooled air in heat exchanging relationship to the inflowing atmospheric air and the outflowing dehydration air.

4. The process of dehydrating materials in a dehydration chamber which consists in reducing the moisture content of atmospheric air by cooling the same, and then heating the cooled air before circulating it around the material to be dried, by passing the cooled air in heat exchanging relationship to the inflowing atmospheric air and the outflowing dehydration air, and then further increasing its temperature by artificial means.

FRANK MAUS.